United States Patent [19]

Fujiwara

[11] Patent Number: 4,701,787
[45] Date of Patent: Oct. 20, 1987

[54] SELECTIVELY ENABLED IMAGE SIGNAL PROCESSING CIRCUIT USING RECURSIVE FILTERING

[75] Inventor: Naohisa Fujiwara, Kyoto, Japan

[73] Assignee: Mitsubishi Denki Kabushiki Kaisha, Tokyo, Japan

[21] Appl. No.: 807,909

[22] Filed: Dec. 11, 1985

[30] Foreign Application Priority Data

Jan. 28, 1985 [JP] Japan .................................. 60-13829
Jan. 28, 1985 [JP] Japan .................................. 60-16212

[51] Int. Cl.$^4$ ......................... H04N 9/64; H04N 5/213
[52] U.S. Cl. ....................................... 358/36; 358/326
[58] Field of Search ..................... 358/19, 20, 36, 326

[56] References Cited

U.S. PATENT DOCUMENTS 3,836,707  9/1974  Murakami et al. ................... 358/36
4,302,768  11/1981  Kamura et al. ....................... 358/36

FOREIGN PATENT DOCUMENTS 130835  11/1979  Japan .
 77289   6/1980  Japan .................................... 358/31
 69997   4/1985  Japan .................................... 358/36
2070385  9/1981  United Kingdom .
2124852  2/1984  United Kingdom .

*Primary Examiner*—John W. Shepperd
*Attorney, Agent, or Firm*—Sughrue, Mion, Zinn, Macpeak & Seas

[57] ABSTRACT

A switch circuit is provided in an operation circuit of an image signal processing circuit device in which a chroma signal reproduced from a VTR is passed through a recursive comb type filter to derive a vertical high frequency component therefrom. A low level component thereof is inverted in phase, and an inverted component is summed with the chroma signal to reduce the noise component of the chroma signal to suspend operation of the operation circuit for a color burst period during a standard speed recording reproducing mode period to thereby provide a chroma signal whose noise component is reduced at an output of the operation circuit for that period.

11 Claims, 5 Drawing Figures

SELECTIVELY ENABLED IMAGE SIGNAL PROCESSING CIRCUIT USING RECURSIVE FILTERING

BACKGROUND OF THE INVENTION

The present invention relates to an image signal processing circuit and, particularly, to such circuit by which the noise level of an image signal in a VTR or television system is reduced.

FIG. 1 is a block circuit diagram showing a conventional image signal processing circuit, which is shown in Japanese Patent Application Laid-Open No. 130835/1979. In FIG. 1, reference numeral 1 depicts an input chroma signal, 4 a 1H delay line for delaying the input chroma signal by a time corresponding to one horizontal scanning period (1H), 5 an output of the 1H delay line 4, 12 an adder for summing the output 5 of the 1H delay line 4 and the input chroma signal 1, 13 a vertical high frequency component which is an output of the adder 12, 14 an amplitude limiter for limiting the amplitude of the vertical high frequency component 13, 15 a vertical noise signal, 16 a level regulator circuit for regulating the level of the vertical noise signal 15, 17 a phase inverter for inverting the phase of an output signal of the level regulator circuit 16, 20 an adder for summing the output signal of the phase inverter 7 and the input chroma signal 1 and 21 an output chroma signal.

In operation, the input chroma signal 1 is delayed by the 1H delay line 4 and is summed with the delayed output 5 from the delay line. That is, the 1H delay line 4 and the adder 12 constitute a comb-type filter, an output of which is the vertical high frequency component 13 in a vertical space frequency range.

A high-level signal component of the vertical high frequency component 13 is cut out by the amplitude limiter 4, resulting in the vertical noise signal 15 composed of only a low-level noise component. The level of the noise signal 15 is regulated by the level regulator 16 such that it is substantially the same as the level of noise contained in the input chroma signal 1, and then the phase thereof is inverted by the phase inverter 17. The output signal of the phase inverter 17 is summed with the input chroma signal 1 by the adder 20, resulting in the output chroma signal 21 having noise components removed.

The comb-type filter shown in FIG. 1 may be replaced by a feedback-type comb filter with the same effect.

In the conventional image signal processing circuit, particularly such a circuit using a recursive comb filter whose phase characteristic is not linear, there may be a case where a signal appears in a place in which such signal should not exist or no signal appears in a place in which such signal should be present. Therefore, if such circuit is used in an automatic phase control loop (APC loop), the latter may malfunction.

FIG. 2 shows an APC loop for a VTR (Video Tape Recorder) in which an image signal processing circuit having the feedback-type comb filter is employed. The APC loop functions to restore the original frequency range (3.58 MHz) of the input chroma signal from a lowered frequency (629 KHz) thereof using an up-converter 30. That is, the color burst signal derived from the output chroma signal by a burst gate 31 is compared in phase with a reference signal (3.58 MHz) from a crystal oscillator 32 by a phase detector 33, and the output of a voltage controlled oscillator 34 is controlled to 3.58 MHz+629 KHz by locking phases. However, since the recursive comb-type filter functions to average the phase variations of the output chroma signal, the locking speed of the APC loop is lowered thereby when a phase locking state is to be reestablished after it has once been unlocked. Similarly, there may be noise generated due to the transient response of the circuit in a high speed picture search mode of the VTR. Furthermore, in the described circuit in which the signal amplitude is limited by the limiter 14, all signal components other than noise are not removed. Therefore, not only the noise, but also high frequency components of the input chroma signal may be removed during the processing of the remaining signal components in the adder 20. Consequently, degradation of the image quality due to degradation of the vertical resolution may be increased, rather than the desired effect of noise removal, depending upon the mode (particualrly, in the standard reproduction mode).

SUMMARY OF THE INVENTION

The present invention was made in view of the above facts, and an object of the present invention is to provide an image signal processing circuit by which the problems produced by passing the input chroma signal through the conventional image signal processing circuit are eliminated and the degradation of image quality is minimized.

The image signal processing circuit according to the present invention in which a signal obtained by passing an input signal through a recursive comb-type filter is processed to remove noise components contained in the input signal or a high frequency component thereof is enhanced is featured by comprising means for suspending an operation of an operation circuit for a predetermined period of time to provide the input signal as an output signal during that time period. That is, in accordance with the present invention, only a high frequency signal supplied to the operation circuit is blocked for the predetermined time period so that the operation circuit provides an output signal which is the same as the input signal thereto.

DESCRIPTION OF THE PREFERRED EMBODIMENTS

Figure 1:
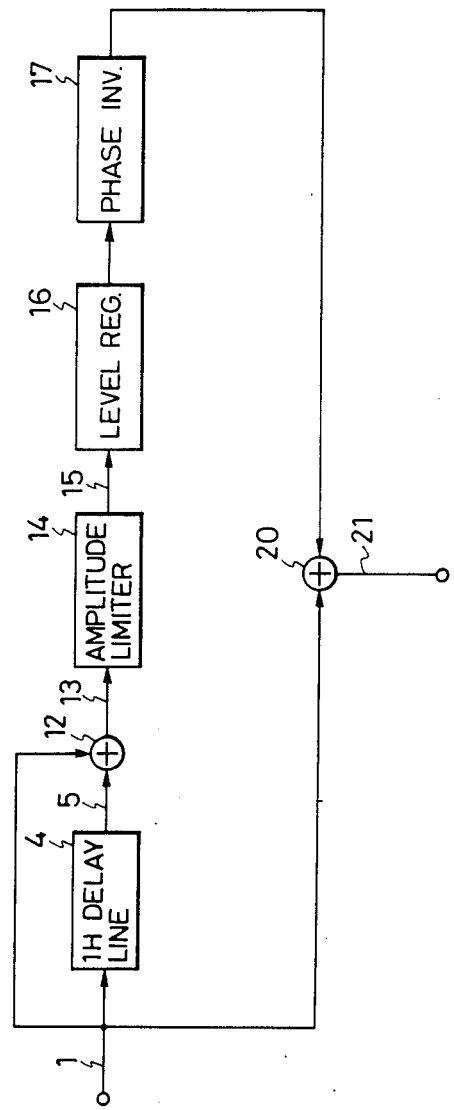
FIG. 1 is a block circuit diagram showing a conventional image signal processing circuit.
Figure 2:
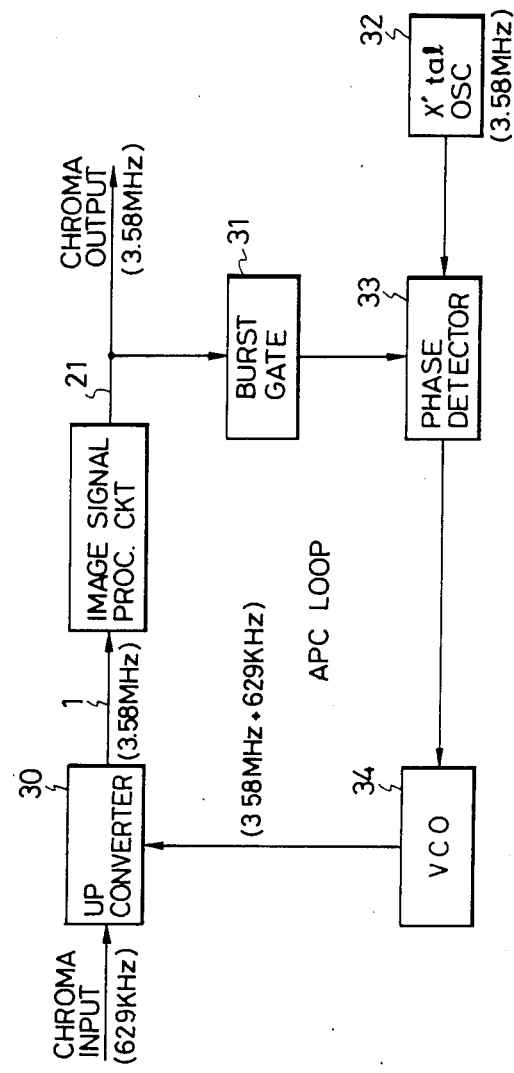
FIG. 2 is a block circuit diagram showing an example of an APC loop.
Figure 3:
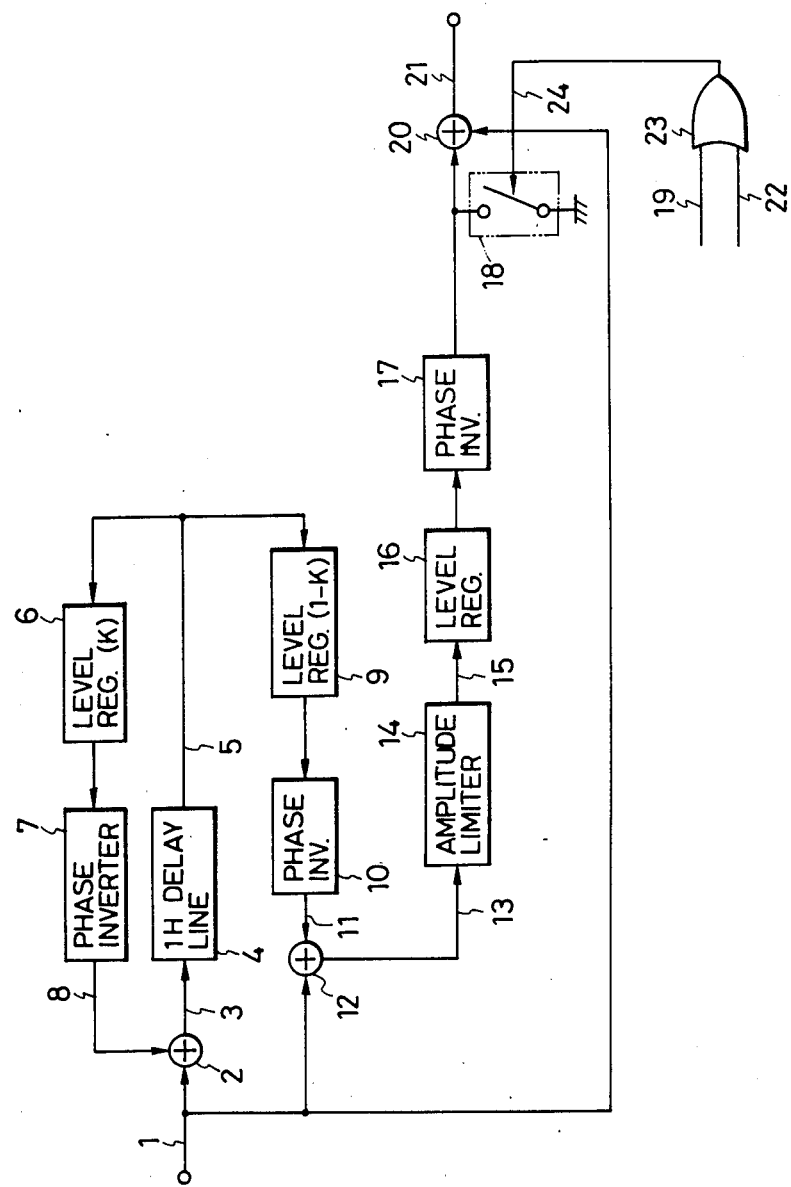
FIG. 3 is a block circuit diagram showing an embodiment of the present invention.

In FIG. 3, reference numeral 1 indicates an input chroma signal, 2 an adder, 4 a 1H delay line, 6 a level regulator which multiplies the output by a factor of K (where K is smaller than 1) and regulates the amount of feedback, 7 a phase inerter, 8 a feedback signal, 9 another level regulator which multiplies the output 5 by a factor of (1-K) to normalize its level, 10 a phase inverter, and 12 an adder for summing the output 11 and the input chroma signal 1. Reference numeral 13 indicates a vertical high frequency component, 14 an amplitude limiter, 15 a vertical noise signal, 16 a level regulator, 17 a phase inverter, 20 an adder, and 21 an output chroma signal, all of which are the same as the like-designated elements or signals shown in FIG. 1.

Reference numeral 19 depicts a first instruction signal instructing suspension of operation for a predetermined period of time such as a time period corresponding a color burst period, 22 a standard speed recording and reproducing mode signal (referred to as standard mode instruction signal hereinafter), 23 an OR gate having a first input supplied with the first instruction signal 19 and a second input supplied with the standard mode instruction signal 22, 24 a second instruction signal for instructing suspension of operation and which is an output of the OR gate 23, and 18 a switch having a first terminal connected to an output of the phase inverter 17 and a second terminal grounded, the switch 18 being on-off controlled by the second instruction signal 24. The switch 18 may be implemented with an analog switch or a transistor switch circuit. The OR gate 23 and the switch 18 together are used for suspending supply of the output of the phase inverter 17 to the adder 20 for the predetermined time period to provide the input chroma signal as an output signal of the circuit. The OR gate 23 may be up diodes.

In operation, the input chroma signal 1 is supplied to the adder 2, whose output 3 is supplied to the 1H delay line 4. An output 5 of the latter is regulated, in the amount of feedback K, by the level regulator 6, and, after being inverted in phase by the phase inverter 7, supplied to the adder 2 as a feedback signal 8.

That is, a recursive comb-type filter is constituted by the adder 2, the 1H delay line 4, the level regulator 6 and the phase inverter 7. The output 5 of the delay line 4, which is an output of the filter, is multiplied by (1-K) by the level regulator 9 to normalize it with respect to the input signal level, and then is inverted in phase by the phase inverter 10, resulting in an output signal 11 of the filter.

The output signal 11 is summed with the input chroma signal 1 in the adder 12, resulting in a vertical high frequency component 13. The vertical high frequency component 13 is limited by the amplitude limit 14 to remove a high level component which is considered as the signal component, the low level component being noise. Therefore, the output of the limiter 14 is a vertical noise signal 15. The vertical noise signal 15 is regulated by the level regulator 16 so that the level thereof is substantially the same as that of noise component contained in the input chroma signal 1, and is inverted in phase by the phase inverter 17.

When the switch 18 is in an off state according to the second instruction signal 24 under the latter condition, i.e., when the reproduction is in the long playing mode and the standard mode instruction signal 22 and the first instruction signal 19 are in inactive states, the noise signal, whose phase is inverted, is supplied to the adder 20 and processed with the input chroma signal 1 supplied to the first input of the adder 20. Therefor, an output chroma signal 21 whose noise component is removed is provided at the output of the adder 20.

On the other hand, when the switch 18 is in an on state according to the second instruction signal 24, i.e., when it is in the standard mode or the signal is in the burst period and the standard mode instruction signal 22 or the first instruction signal 19 is in an active state, the output of the phase inverter 17 is grounded through the switch 18, and thus supply of the noise signal to the adder 20 is suspended. As a result, the input chroma signal 1, which is supplied to the first input of the adder 20, appears at its output as the output chroma signal 21.

In the present device in which there is no signal processing, i.e., the input chroma signal 1 is directly used as the output chroma signal 21 by means of the OR gate 23 and the switch 18, during the standard speed recording and reproducing period and the burst period, there is not burst signal distortion, and thus the APC operation can be performed normally, resulting in minimized image quality degradation due to the existence of the signal processing circuit.

Figure 4:
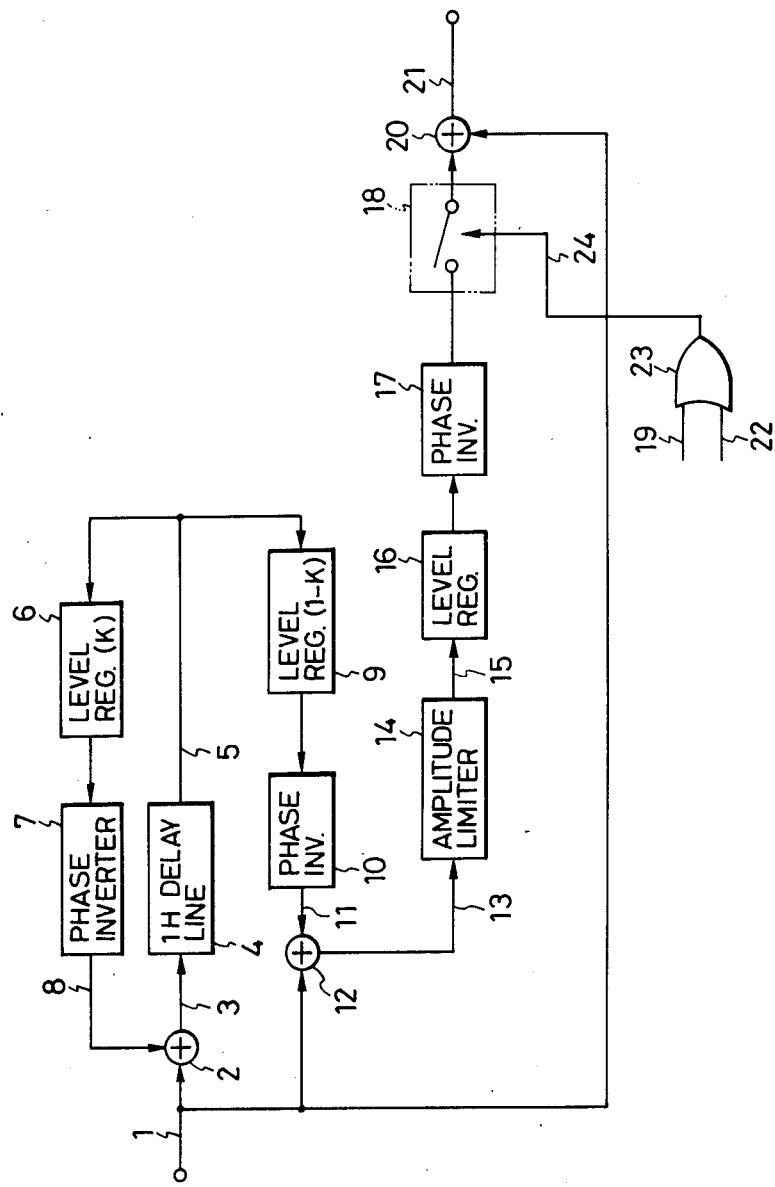
FIG. 4 is a block circuit diagram showing another embodiment of the present invention.

FIG. 4 shows another embodiment of the present invention, which differs from the embodiment shown in Fig. 3 only in the arrangement of the switch 18. That is, in FIG. 4, the switch 18 is connected between the phase inverter 17 and the adder 20. The operation of the embodiment in FIG. 4 is substantially the same as that of the circuit in FIG. 3, except that, in the FIG. 4 embodiment, an output signal whose noise is reduced is obtained when the switch 18 is in the on state and the output signal is the input signal when the swtich 18 is in the off state.

Although the operation suspending period which is specified according to the first instruction signal is made to correspond to the burst period in the described embodiments, it is possible to suspend the operation during the horizontal or vertical blanking periods. In the latter case, it is possible to obtain a television signal which satisfies the NTSC standard, in addition to the effects mentioned previously. Further, it is possible to perform logical operations by using a plurality of mode instruction signals of the VTR, such as the high speed picture search mode and standard speed mode instruction signals.

The location of the switch 18 is not limited to the downstream side of the phase inverter as in the described embodiments. It may be any location between the adders 12 and 20.

Figure 5:
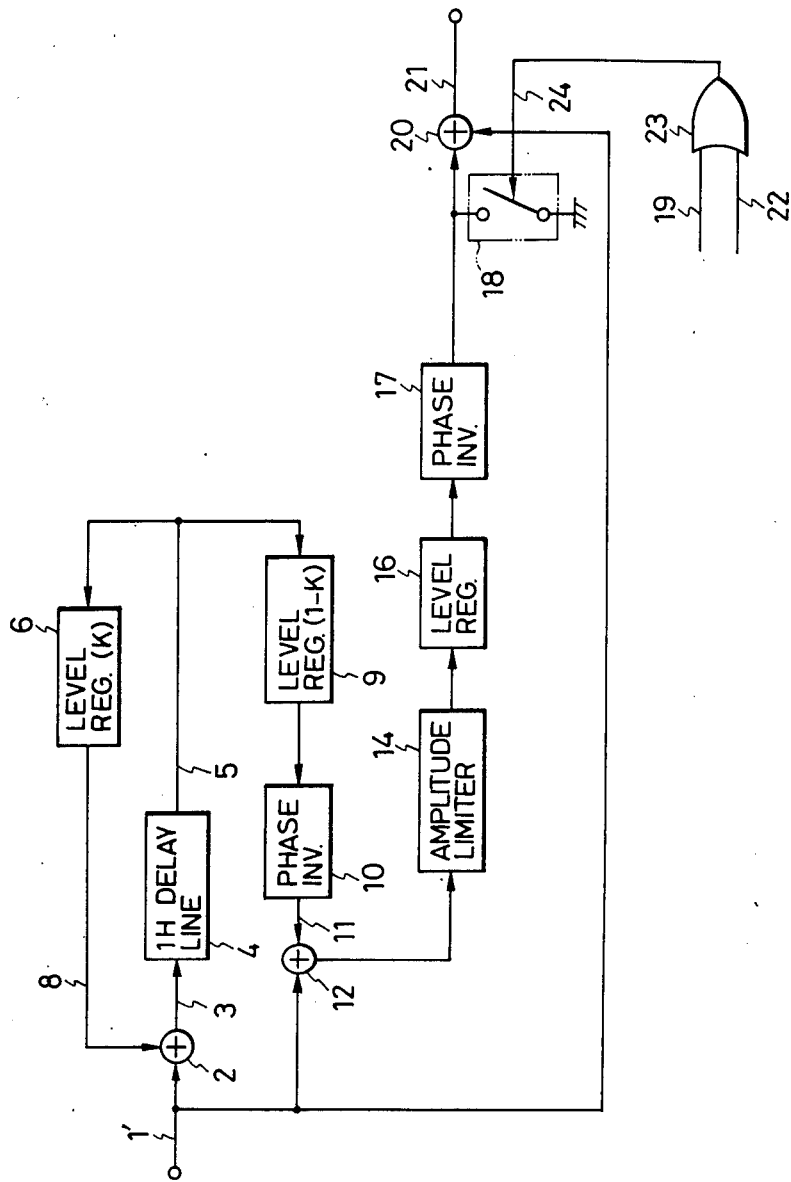
FIG. 5 is a block circuit diagram showing another embodiment of the present invention.

Further, although a subtraction operation is performed for the input signal by means of the phase inverter 17 and the adder 20, the present invention can be applied to a device which has no phase inverter 17 so that addition is performed on the input signal to enhance the high frequency component thereof. The input signal, which is described as the chroma signal, may be the luminance signal. FIG. 5 shows an embodiment in which the phase inverter 7 is omitted because the recursive comb filter performs an in phase feed back. In FIG. 5, a reference numeral 1' depicts a luminance signal.

As mentioned hereinbefore, according to the present invention, which is directed to an image signal processing circuit in which a noise component of an input signal is removed or high freuqency component thereof is enhanced by using a signal obtained by processing the input signal through a recursive comb-type filter, the operation of the processing circuit is suspended for a predetermined time so that the input signal is provided as the output signal. Therefore, it is possible to eliminate disadvantages caused by the presence of the signal processing to thereby minimize the degradation of image quality.

What is claimed is:

1. An image signal processing circuit device comprising: a delay circuit for delaying an input signal by a time corresponding to one horizontal scanning period, a first level regulator for multiplying an output signal of said delay circuit by a factor K to regulate an amount of feedback, where K is smaller than unity, a first adder for summing said video signal and an output signal of said first level regulator, said first adder having an output connected to an input terminal of said delay circuit, a second level regulator for multiplying said output signal of said delay circuit by a factor (1-K), a first phase inverter for inverting a phase of an output signal of said second level regulator, a second adder for summing said video signal and an output signal of said first phase inverter, an amplitude limiter for limiting an amplitude of an output signal of said second adder, a third level regulator for regulating an output signal of said amplitude limiter to a noise level of said video signal, a second phase inverter for inverting a phase of an output of said third level regulator, and a third adder for summing said video signal and an output signal of said second phase inverter, said third level regulator, said second phase inverter, and said third adder constituting an operation circuit.

2. The image signal processing circuit device as claimed in claim 1, when said filter further comprises a third phase inverter provided between said output of said first level regulator and said input of said first adder.

3. The image signal processing circuit device as claimed in claim 2, further comprising: a switch circuit for suspending an operation of said operation circuit for a predetermined period of time to obtain said video signal at an output terminal of said third adder.

4. The image signal processing circuit device as claimed in claim 3, further comprising: a logic circuit for performing a logic operation on an operation suspending instruction signal and a mode signal of a VTR to control an operation of said switch circuit.

5. The image signal processing circuit device as claimed in claim 4, wherein said logic circuit is an OR ciruit responsive to said operation suspending instruction signal and said mode signal to cause said switch circuit to suspend said output signal of said amplitude limiter when either said instruction signal or said mode signal is present.

6. The image signal processing circuit device as claimed in claim 5, wherein said operation suspending period instructed by said operation suspending instruction signal is a color burst period of said video signal.

7. The image signal processing circuit device as claimed in claim 5, wherein an operation suspending period instructed by said operation suspending instruction signal is a horizontal blanking period of said video signal.

8. The image signal processing circuit device as claimed in claim 5, wherein an operation suspending period instructed by said operation suspending instruction signal is a vertical blanking period of said video signal.

9. The image signal processing circuit device as claimed in claim 5, wherein an operation suspending period instructed by said mode signal of said VTR is a standard speed recording or reproducing mode period.

10. The image signal processing circuit device as claimed in claim 1, wherein said video signal is a chroma signal.

11. The image signal processing circuit device as claimed in claim 1, wherein said video signal is a luminance signal.

* * * * *